Nov. 13, 1962 J. PERROCHAT 3,063,114
MOLDING FASTENER
Filed April 24, 1959

INVENTOR:
JEAN PERROCHAT,
BY James B. Tiffany Jr.
ATTORNEY.

United States Patent Office 3,063,114
Patented Nov. 13, 1962

3,063,114
MOLDING FASTENER
Jean Perrochat, Basel, Switzerland, assignor to
A. Raymond, Grenoble, France, a firm
Filed Apr. 24, 1959, Ser. No. 808,631
1 Claim. (Cl. 24—73)

The invention concerns a device for the waterproof attachment of one object to another, especially attachment of ornamental moldings to automobiles. Many attempts have already been made to produce practicable devices for this purpose, but until now there was still no procedure which achieved a secure waterproof attachment with very simple means and especially one which offered no difficulties in the assembly.

By means of this invention a new device is proposed which has the advantage of involving no excessive production costs, allowing a simple assembly, and which at the same time is strong enough to be adapted to the given requirements. In addition, the invention is designed to furnish a doubled protection against the penetration of water or dampness into the body from outside at the points of attachment.

The invention is characterized mainly by the fact that the device consists of two parts working together in the manner of a snap fastener, the one part as a ring or hollow cylinder snapping into an opening of the attachment support, and the other part is a stud holding the object to be attached and snapping into the ring or hollow cylinder. The ring or hollow cylinder and the stud are made of material of different hardness and elasticity with relation to each other, and the softer more elastic part is held in the joined state with longitudinal tension by the harder less elastic part. The material used can be either a suitable plastic of great hardness and strength but little elasticity and for the other a suitable softer plastic with great elasticity, or on the one hand can be a non-rusting metal, for example bronze, brass, aluminum or the like and on the other hand flexible plastic, for example polyethylene.

Before mounting the object, for example the ornamental molding, the ring or hollow cylinder is pressed into the corresponding opening of the attachment support and is held there by appropriate means, for example lugs. The stud, which is shaped to correspond to the object to be attached and is joined to it before the assembly, is pressed into the ring and because of its special design it presses the elastic material of the ring or hollow cylinder out to the side and downward and is held in the ring or hollow cylinder in the fashion of a snap-fastener. This snap-fastener type connection can be taken apart as often as is desired with no damage to the individual parts.

Further characteristics and details of the invention are given in the following description of a sample design shown in the drawing. Shown are:

Figure 1:
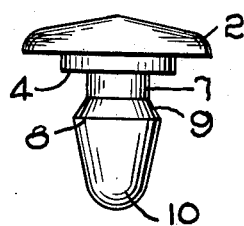
FIG. 1 is a view in front elevation of the attachment stud.
Figure 3:
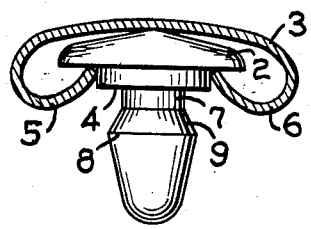
FIG. 3 is a view on the attachment stud inserted in an ornamental molding.

The attachment stud 1 shown in FIG. 1 is manufactured of an appropriate plastic of great hardness and strength but slight elasticity and has a head 2 which is fitted to the object to be attached, in the present case the inner shape of an ornamental molding 3. The head has a lower surface 4 which forms a suitable offset with the head at a lateral extent which corresponds to the space between the in-turned legs 5 and 6 of the ornamental molding. In the sample design the stud is cylindrical and is inserted from the front of the molding into it to the proper spot (FIG. 3). At an interval from the stud head on the shaft 7 is provided a shoulder 8, the front of which next to the stud head is formed as diagonal surface 9 pointing to the stud head. The free end of the stud shaft from the shoulder 8 on is formed as a rounded cone-shaped point 10.

Figure 2:
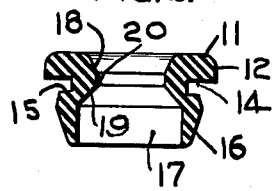
FIG. 2 is a view in section of the attachment ring.
Figure 4:
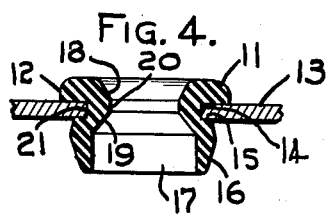
FIG. 4 is a view in section of the attachment ring fitted into a body panel.
Figure 6:
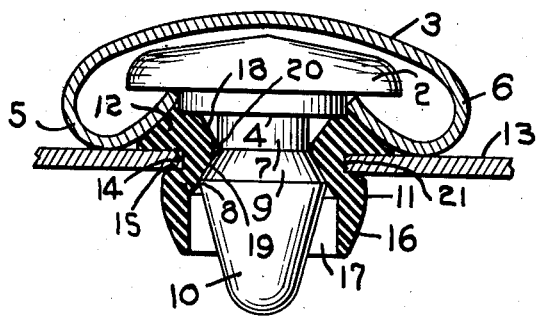
FIG. 6 is a view in section through an assembled ornamental molding with attachment stud and attachment ring magnified.
Figure 5:
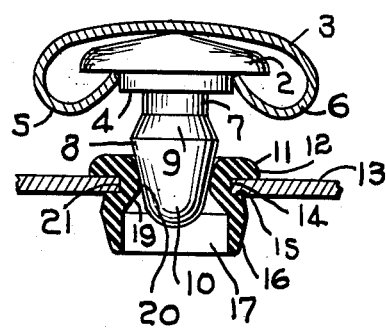
FIG. 5 is a view of the stud superposed above the grommet prior to assembly.

FIG. 2 shows the attachment ring or hollow cylinder 11 which works with the attachment stud 1. It is manufactured from a suitable soft plastic with great elasticity. The upper end of the hollow cylinder is widened to a collar-shaped projection 12, which fits later with its lower plane on the attachment support 13, for example a body plate (FIG. 4). Immediately next to the projection there is provided in the outer casing of the hollow cylinder a peripheral slot which corresponds approximately to the thickness of the attachment support and the side of which turned away from the collar-shaped projection is shaped like an oblique shoulder. The lower end of the hollow cylinder forms on the outside casing a conical surface narrowing toward the end 16. In the bore 17 of the hollow cylinder is a peripheral shoulder 20 with oblique inward pointed lateral surfaces 18 and 19. The free passage in the shoulder 20 is less than the diameter of the shoulder 8 of the stud shaft 7.

For use of the attachment device described, corresponding openings 21, for example straight bores, are to be provided in the attachment support into which the hollow cylinder 11 is squeezed. Since, as was mentioned before, the material of the hollow cylinder is relatively soft and elastic, it can very easily be introduced into the opening, because, due to the centre bore 17, the hollow cylinder can be compressed in radial direction. The installation is made easier by the conical surface 16 on the outside casing. The hollow cylinder is pressed into the opening until its ridge snaps into the peripheral slot 14 and the collar-shaped projection 12 lies on the support. By means of the oblique shoulder 15, differences in the thickness of the support can be compensated and thus a proper fit of the hollow cylinder can always be assured. Now if the attachment stud of hard unelastic material inserted in the ornamental molding 3 is introduced into the bore of the elastic hollow cylinder 11, then the shoulder 20 of the hollow cylinder spreads out and springs back again into its old position as soon as the stud with its shoulder comes to lie underneath the shoulder 20.

In the unassembled stage the distance in longitudinal direction in the hollow cylinder between the upper flat surface and the lateral surface or diverging surface 19, turned away from it, of the inside shoulder 20 is larger by a slight amount than the distance in longitudinal direction between the flat surface 4 of the stud head 2 and the oblique or diagonal surface 9 of the shoulder on the stud shaft 7. Thus it is arranged that the attachment stud 1 is always under tensile stress and not only with its head but also with its shoulder is pressed firmly and tight against the elastic hollow cylinder, whereby its collar-shaped projection 12 is pressed tight against the support, the bottom of its peripheral slot 14 tight against the edge of the opening 21 and its oblique shoulder 15 tight from underneath against the under ridge of the opening.

Because of the conical opening of the bore 17 in the hollow cylinder 11, the attachment stud 1 can easily be introduced into it, especially even when the object to be attached is to be fastened at hidden or not easily accessible spots.

In the sample device represented and described the attachment stud and the hollow cylinder have in cross section a pure cylindrical form. They can however be formed square, rectangular or slightly rounded even in the cross section, especially if they are manufactured from suitable thermoplastic plastics. The openings in the attachment supports must then have the shape necessary for this.

Since certain other obvious modifications may be made in this device without departing from the scope of the invention, it is intended that all matter contained herein be interpreted in an illustrative and not in a limiting sense.

I claim:

A molding fastener assembly including a snap fastener attachment grommet and an attachment stud, said attachment stud having a head portion and a shaft extending from said head portion, said shaft having an external circumferential shoulder, said shoulder having a diagonal surface directed toward the plane of said head portion, said snap fastener attachment grommet having a tubular body, of compressible material and having a first and second open end, said body having an internal converging surface forming an internal shoulder, said internal diverging surface formed to engage said diagonal surface of said shaft, when said stud is inserted in said grommet, and the axial distance from said first open end to said internal diverging surface being slightly greater than the distance between said head portion and said diagonal surface prior to assembly and the diameter of said internal shoulder being less than the diameter of said second open end.

References Cited in the file of this patent

UNITED STATES PATENTS

| | | |
|---|---|---|
| 2,225,472 | Franklin | Dec. 17, 1940 |
| 2,610,879 | Pope | Sept. 16, 1952 |
| 2,655,239 | Kenlock | Oct. 13, 1953 |
| 2,800,526 | Moorhead | July 23, 1957 |

FOREIGN PATENTS

| | | |
|---|---|---|
| 621,404 | Great Britain | Apr. 18, 1949 |
| 788,742 | Great Britain | Jan. 8, 1958 |